United States Patent [19]

Uomori et al.

[11] Patent Number: 5,019,901
[45] Date of Patent: May 28, 1991

[54] IMAGE MOTION VECTOR SENSOR FOR SENSING IMAGE DISPLACEMENT AMOUNT

[75] Inventors: Kenya Uomori, Katano; Atsushi Morimura, Nara, both of Japan

[73] Assignee: Matsushita Electric Industrial Co., Ltd., Osaka, Japan

[21] Appl. No.: 498,902

[22] Filed: Mar. 26, 1990

[30] Foreign Application Priority Data

Mar. 31, 1989 [JP] Japan .................................. 1-083461

[51] Int. Cl.⁵ ............................................... H04N 7/18
[52] U.S. Cl. ...................................... 358/105; 358/136
[58] Field of Search ................. 358/105, 108, 22, 133, 358/135, 136, 141, 138

[56] References Cited

U.S. PATENT DOCUMENTS

| | | | |
|---|---|---|---|
| 4,802,005 | 1/1989 | Kondo | 358/138 |
| 4,845,560 | 7/1989 | Kondo | 358/133 |
| 4,862,264 | 8/1989 | Wells | 358/105 |

FOREIGN PATENT DOCUMENTS

61-269475 11/1986 Japan .

Primary Examiner—Howard W. Britton
Assistant Examiner—Sherrie Hsia
Attorney, Agent, or Firm—Stevens, Davis, Miller & Mosher

[57] ABSTRACT

An image motion vector sensor is provided which includes a motion vector sense section in which an input signal of an image plane is subdivided into a plurality of sense domains so as to compute a motion vector of an image in each of the domains, a motion vector decision section for judging validity of the motion vector in each domain so as to decide a motion vector of an entire image plane, a vector reliability density decision section for producing a coefficient which is a function of the density with respect to time of a signal proportional to the number of the domains judged to be valid, and a control section for controlling a magnitude of the motion vector of the entire image plane based on an output from the vector reliability density decision section.

8 Claims, 9 Drawing Sheets

FIG. 10A
PRIOR ART (CASE OF 9 REPRESENTATIVE POINTS IN A DOMAIN)

(CASE OF 6 DOMAINS IN AN IMAGE PLANE)

FIG. 10B
PRIOR ART

IMAGE MOTION VECTOR SENSOR FOR SENSING IMAGE DISPLACEMENT AMOUNT

BACKGROUND OF THE INVENTION

1. FIELD OF THE INVENTION

The present invention relates to an image motion vector sensor for sensing an amount of displacement or movement of an image.

2. DESCRIPTION OF THE PRIOR ART

A conventional sensor for sensing a motion vector of an image has been described, for example, in the JP-A-61-269475.

Figure 9:
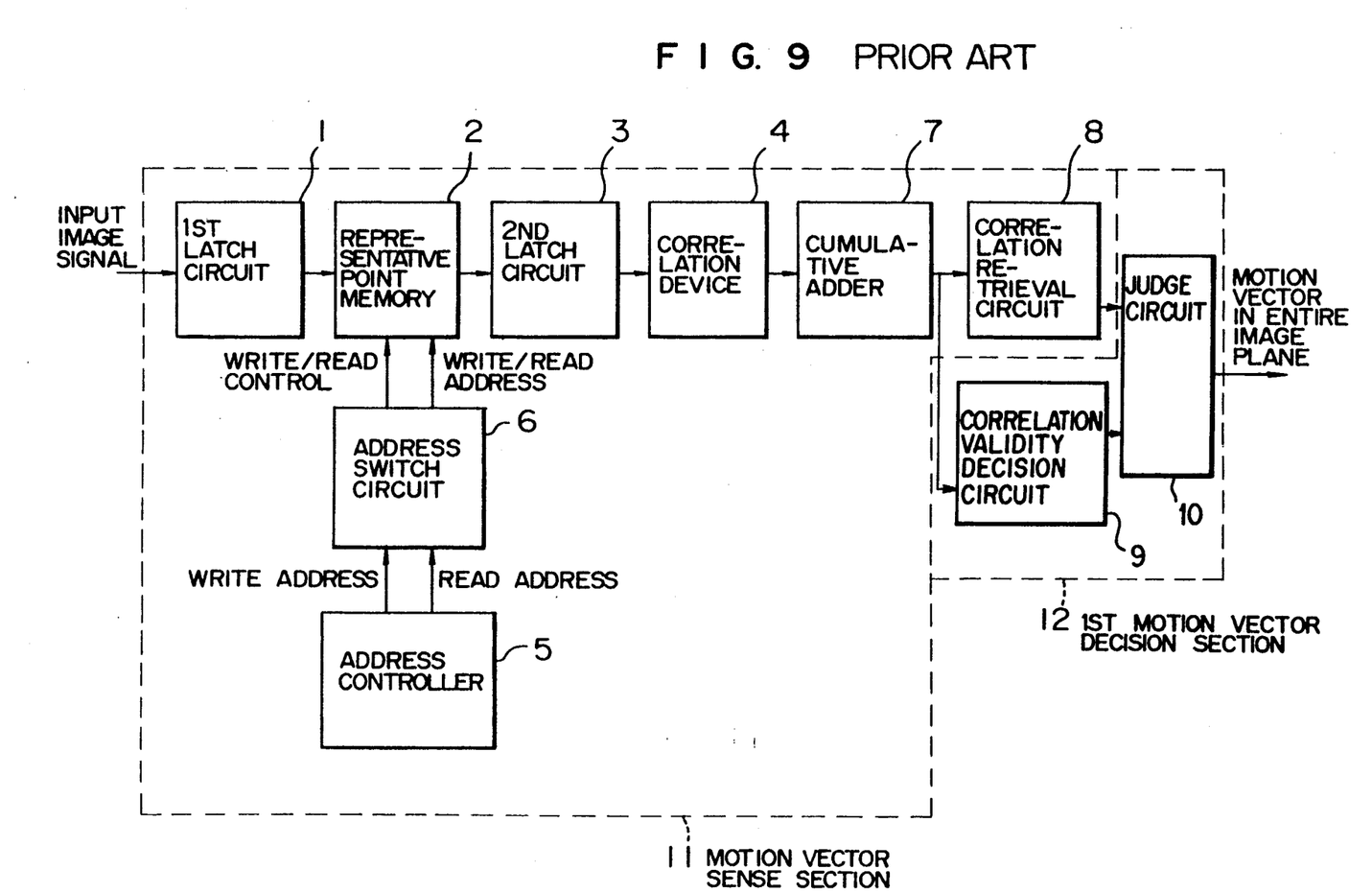
FIG. 9 is a configuration diagram of a conventional image motion vector sensor.

FIG. 9 illustratively shows the image motion vector sensor, which comprises a first latch 1, a representative point memory 2, a second latch 3, a correlation device 4, an address controller 5, an address switch circuit 6, a cumulative adder 7, a correlation retrieval circuit 8, a correlation validity decision circuit 9, and a decision circuit 10.

A description will now be given of an image motion vector sensor employing the conventional correlation computing device configured as above.

Figure 8A:
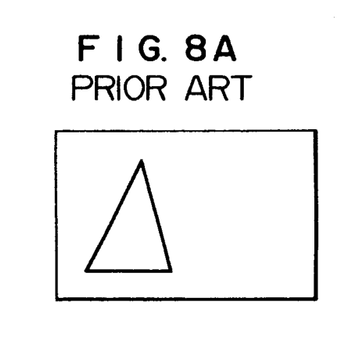
FIGS. 8A, 8B and 8C are explanatory diagrams useful to explain a motion vector of an image.
Figure 8B:
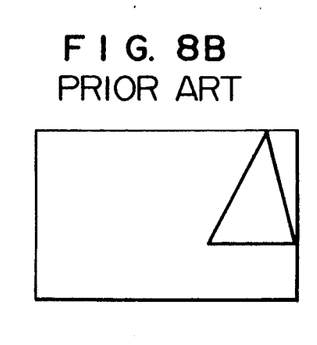
Figure 8C:
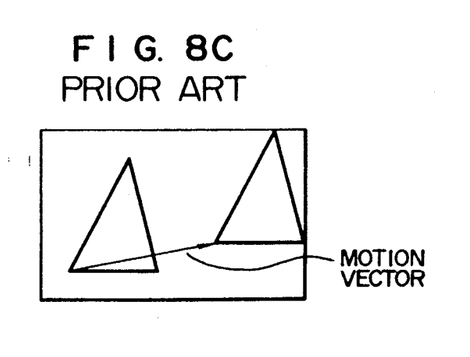

First, a motion vector of an image will be described. FIGS. 8A, 8B and 8C respectively show an image displayed at a point of time and an image developed after a field or frame. When an image undergoes a translational displacement as above due to a movement of an imaging device or the like, the amount of the translational displacement of the image as indicated by an arrow in a FIG. 8C is represented by a vector, which is called a motion vector.

Next, a method for sensing the image motion vector will be described.

Figure 10A:
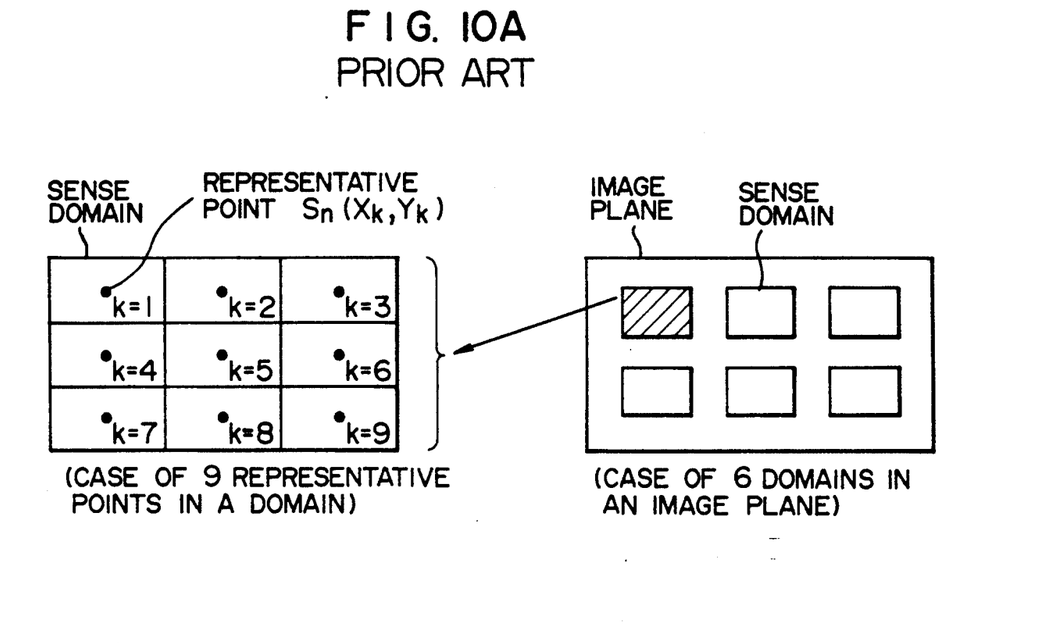
FIG. 10A is an explanatory diagram for explaining the relationship between sense domains in an image plane and the motion vector sense regions included in each sense domain.
Figure 10B:
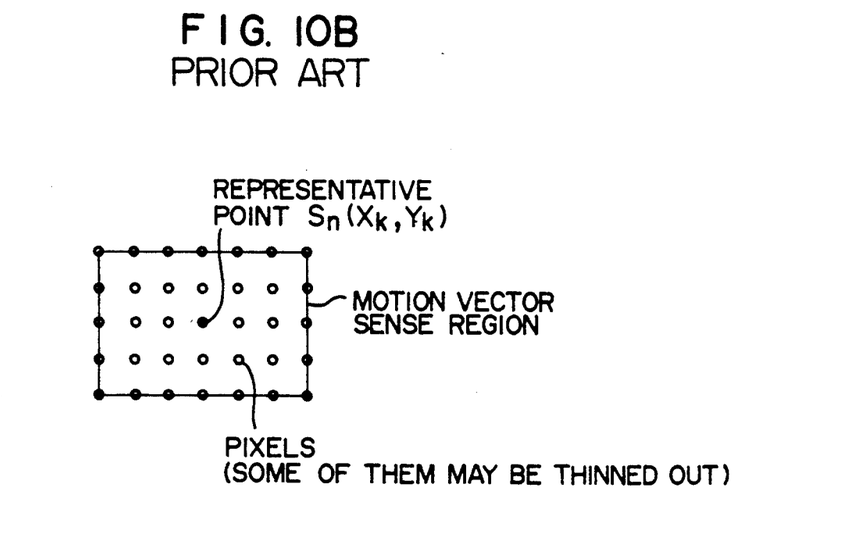
FIG. 10B is an explanatory diagram for explaining a state of a representative point and pixels around the representative point employed in a representative point matching method.

A so-called representative point matching method is most commonly employed so as to sense a motion vector. According to the representative point matching method, first, as shown in FIG. 10A, an entire image plane is divided into a plurality of sense domains (6 domains are illustrated), and each sense domain is further divided into a plurality of motion vector sense regions (9 regions are illustrated), each of the regions having a representative point in it. FIG. 10B shows a motion vector sense region including a representative point and pixels around the representative point.

Then, the image motion vectors are sensed in respective sense domains by finding, with the correlation calculation between the image data of the previous an the present field (or frame), the location of a pixel in the present field (or frame) to which an image has displaced from the location of the representative point in the previous field (or frame) the image having been located. Finally, a single motion vector representing an entire image plane is decided amongst the motion vectors sensed in respective sense domains.

Referring to FIGs. 10A and 10B, a further detailed description of the representative point matching method will be given.

First, an absolute difference between the image data $S_{n-1}(X_k, Y_k)$ of the representative point at a coordinate $(X_k, Y_k)$ in the (n−1)th field (or frame) and the image data $S_n(X_{k+i}, Y_{k+j})$ of a pixel at a coordinate $(X_{k+i}, Y_{k+j})$ around the representative point within the k-th moving vector sense region in the n-th field (or frame) is calculated, where k is the serial number for appointing a representative point, i and j are coordinate differences between the representative point and the pixel of attention, where the variable range of i and j correspond to the range within which a motion vector is sensed, and n denotes discrete time. The above difference calculation is performed between the representative point and each of the surrounding pixels in the respective motion vector sense regions. Then, the absolute differences, calculated for each pixel at the location having the same coordinate values on the relative coordinates fixed to the representative point in the respective motion vector sense regions, are added together. In the case of FIG. 10A, as there are 9 representative points, the above cumulative addition is carried out for 9 absolute difference data on each pixel. This cumulative addition results in a set of correlation values P(i, j), the number of which equals to the number of pixels included in one motion vector sense region.

The arithmetic operations described above can be written in the following formula:

$$P(i,j) = \Sigma |S_{n-1}(X_k, Y_k) - S_n(X_{k+i}, Y_{k+j})| \quad (1)$$

where Σ indicates a summation operation within the variable range of suffix number k, which varies from 1 to the number of the representative points in one sense domain, 9 in the case of FIG. 10A.

The correlation values P(i, j) are thus obtained, and a small P(i, j) value indicates a high correlation, a high P(i, j) value a low correlation. Since the input signals are of the two pictures the one of which has resulted from a translational displacement of the other, there is only one state in which these two pictures can overlap each other. The overlapping state of the two pictures is sensed by finding the coordinate (i, j) where P(i, j) has a minimum value. Then, the image motion vector is given as the coordinate value (i, j). Accordingly, the motion vector is determined with the following operation:

$$V(i, j) = (i, j) \text{ for } \min\{P(i, j)\} \quad (2)$$

where "min" denotes an operator for selecting the minimum.

A method for sensing the motion vector with above mentioned arithmetic operations is called the representative point matching method, by which a method vector for each domain is sensed.

Next, referring to FIGS. 9, 10A and 10B, a description will be given of an image motion vector sensor employing the conventional correlation computing device.

Image data at the respective representative points in a field or frame are fetched into a first latch 1 in response to a timing pulse LP1 so as to be written at an appropriate timing in the representative point memory 2 at addresses associated with the respective representative points. Thereafter, in the subsequent field or frame, the system computes correlation between image data at respective pixels in a motion vector sense regions associated with the respective representative points and the image data at the representative points of the previous field beforehand stored in the representative point memory 2, thereby sending the result to the cumulative adder 7. The cumulative adder 7 adds together the correlation data which are associated with the same coordinate positions with the representative point set as a reference in respective motion vector sense regions. When the cumulative addition of the above data is completed for all motion vector sense regions, the correlation retrieval circuit 8 checks the cumulative values kept in the cumulative adder 7 to decide a position where the correlation develops a highest value. That is, with the position of the representative point set as the reference, the position (address) of the highest correlation value is obtained as a motion vector Furthermore, based on a distribution (a mean value, a minimum value, a maximum value, a gradient, or the like) of the correlation values around the representative point, the correlation validity decision circuit 9 judges to decide whether or not the motion vector attained from the correlation computation is valid.

Above-mentioned sensing of image motion vectors and decision of correlation validity are, as shown in FIG. 10A, carried out for a plurality of sense domains, and result in, for every image plane, a plurality of motion vectors which are decided to be valid.

And, amongst valid motion vectors sensed, a single motion vector that represents an entire image plane is decided by a judge circuit 10. In order to make the above decision, a method which is often employed is that a mean value with respect to the valid motion vectors sensed in one image plane or a median of the valid motion vectors is construed as the motion vector representing an entire image plane.

Since the operation above is carried out for each field or frame, in order for the system to save image data of a representative point in the subsequent field or frame while conducting the correlation computation, where is disposed the first latch 1. Moreover, the second latch 3 is used to keep image data at the representative point while correlation is being established between image data at a representative point in the previous field or frame and image data around the representative point in the present field or frame.

In a portion enclosed with broken lines of FIG. 9, a portion in which a motion vector is sensed through the correlation computation constitute a motion vector sense section 11, whereas a portion in which a motion vector representing an entire image plane is obtained by use of motion vectors attained in respective sense domains and correlation information of the vectors attained by the motion vector sense section 11 forms a first vector decision section 12.

In the constitution above, however, depending on a state of the input image signal, the number of sense domains in which the vector can be sensed varies. In the worst case, the motion vector is rarely sensed, and in other case, the motion vector can be sensed or cannot be sensed such that the output motion vectors are only sporadically generated. This leads to a problem that the sensed motion vectors are discontinuous with respect to time.

SUMMARY OF THE INVENTION

It is therefore an object of the present invention to provide an image motion vector sensor in which even when a state where the input image is poor and the image motion vector hardly be sensed, the sensed motion vector of the image is developed in a continuous form with respect to time, thereby solving the problem above.

According to the present invention, there is provided an image motion vector sensor comprising a motion vector computing section in which an input image signal is subdivided into a plurality of sense domains so as to compute a motion vector of an image in each said domain, a motion vector decision section for judging validity of the motion vector in each said domain so as to decide a single motion vector in an entire image plane, a vector reliability density decision section for producing a coefficient proportional to a density with respect to time of a signal proportional to the number of the sense domains judged to be valid, and a control section for controlling a magnitude of the motion vector in an entire image plane based on an output from said vector reliability density decision section.

A motion vector with respect to an entire image plane obtained from the vector decision section (which is hereinafter referred to as the "interim motion vector") is controlled its magnitude by a time-density of numbers of sense domains in which the sensed motion vectors are decided to be valid (hereinafter referred to as the "valid domain"), and the magnitude of the output vector is controlled to a small value if the number of the valid domains is small. This reduces a discontinuity in the magnitude of the output motion vector due to a sporadic detection of motion vectors in respective sense domains where valid motion vectors are rarely sensed.

As the control section to control the magnitude of the output motion vector, a multiplier, an integrator or the like are available. The multiplier directly multiplies the interim motion vector by a coefficient proportional to the time-density above, and the integrator controls the time-integration operation of the interim motion vectors with a similar coefficient.

Suppose a state that motion vectors are not sensed in almost all sense domains but in rare intervals the valid sensing occur in some domains. In such a state, if an outputting scheme is employed, where a "0" is outputted whenever motion vector can not be sensed and the interim motion vector itself is outputted when a motion vector is detected, the output motion vector becomes discontinuous with respect to time. However, by employing another outputting scheme to control the output to a small value when motion vector can not be sensed, the above discontinuity in output motion vector is reduced.

Here, the time-density of numbers of the valid domains is obtained by averaging the numbers of the valid domains with a lowpass filter circuit, where the averaging is performed by summing the numbers of the valid domains which arise during the time interval of the time-constant of the lowpass filter circuit and by dividing the sum by the time-constant. For instance, for the series of numbers of the valid domains:

$$4, 4, 4, 4, 4, 4, \ldots,$$

the time-density of the valid domains will be 4, while for the series of numbers of the valid domains:

$$1, 0, 0, 1, 1, 0, \ldots,$$

the time-density of the valid domains will be a some value between 0 and 1 depending on the time-constant being set to the lowpass filter circuit. For a longer time-constant of the lowpass filter, an average for a longer time interval is attained.

By using the time-density of the numbers of the valid domains thus obtained, the magnitude of the output motion vector with respect to an entire image plane is controlled.

In the constitution according to the present invention, based on a coefficient proportional to a density with respect to time of a signal proportional to the number of the valid domains, a magnitude of each of the sensed motion vectors is controlled.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1A:
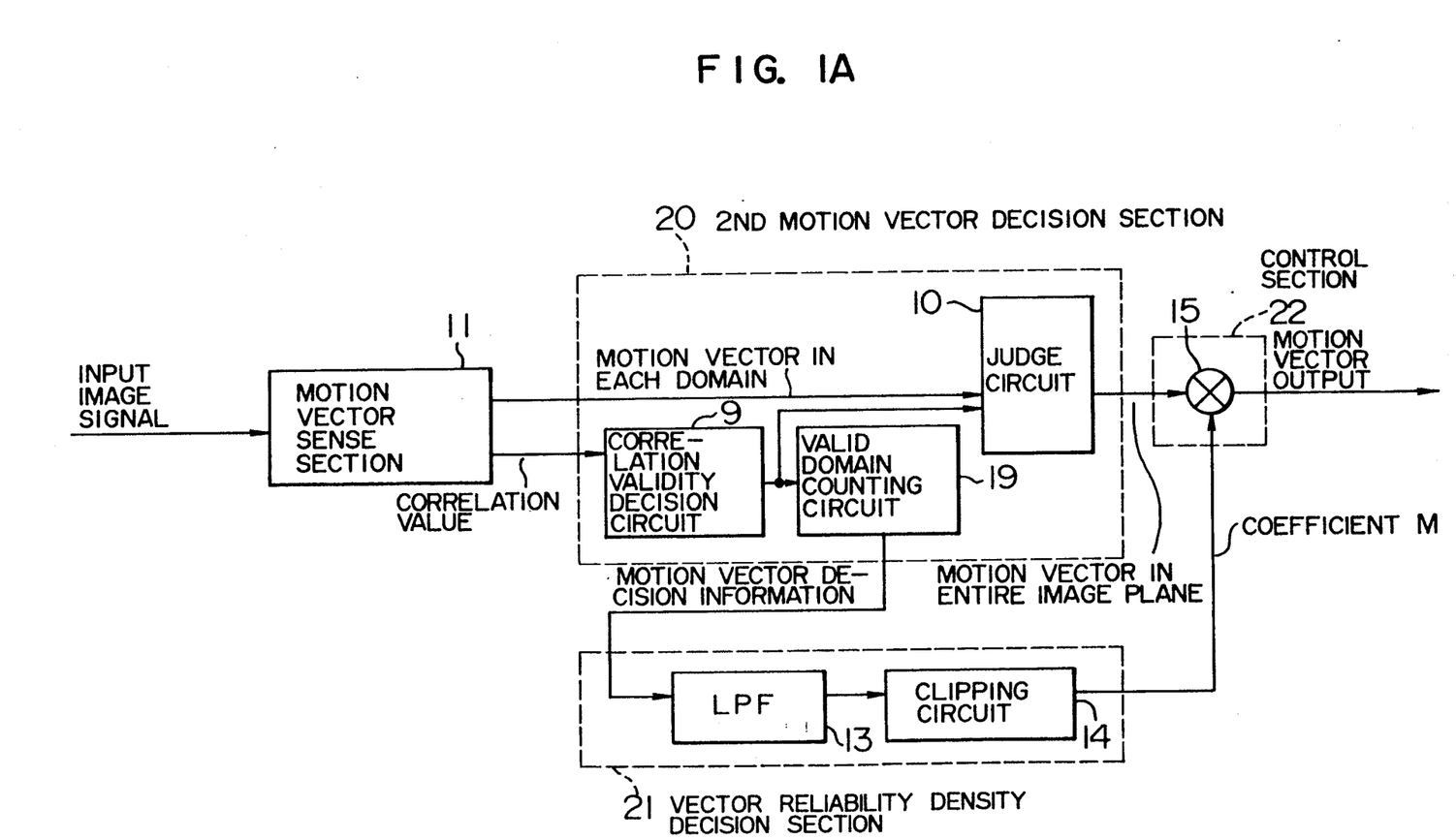
FIG. 1A is a configuration diagram of an image motion vector sensor as a first embodiment according to the present invention.

FIG. 1A is a configuration diagram of an image motion vector sensor as a first embodiment according to the present invention.

This system includes a motion vector sense section 11 and a second motion vector decision section 20, which are configured in the same fashion as for the conventional example, except that the second motion vector decision section 20 includes a valid domain counting circuit 19. The system further comprises a vector reliability density decision section 21 which includes a lowpass filter (LPF) 13 and a clipping device 14 and a control section 22 which includes a multiplier 15.

A description will next be given of the operation of the image motion vector sensor configured as above.

In FIG. 1A, in the similar manner as in the case of the conventional example, the vector sense section 11 first senses for each sense domain a motion vector between fields or frames of input image signals. The second motion vector decision section 20 then judges to determine validity of the motion vector sensed for each domain, thereby obtaining a motion vector in an entire image plane (an interim motion vector).

Figure 1B:
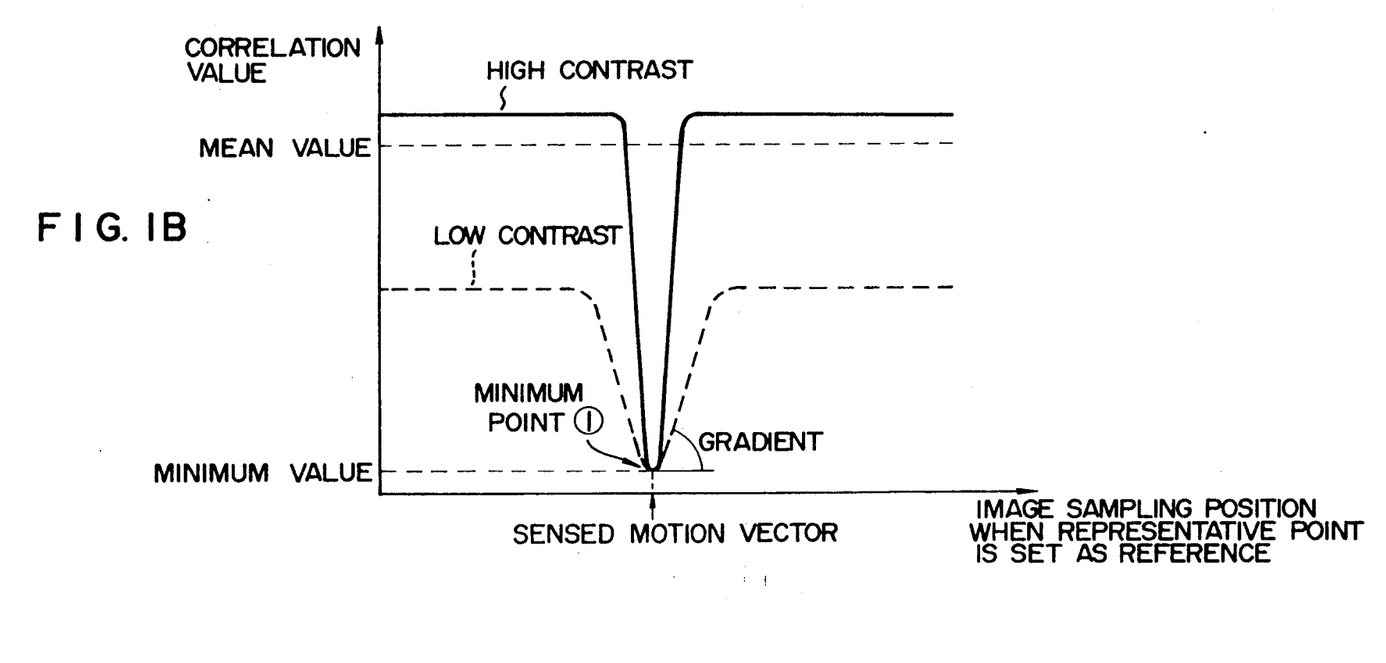
FIG. 1B is a characteristic diagram of correlation values of an image sensed by use of the embodiment above.

A example of the validity judgment of the motion vector will now be described in more detail. Motion vector sense information is developed as an output from the cumulative adder 7 of FIG. 9. FIG. 1B shows an ordinary output example from the adder 7. In this graph, a position where the correlation value takes a minimum value represents the motion vector. When a contrast of an input image is high, the correlation value considerably changes as designated by solid lines, which results in a motion vector sense operation with a high precision. As contrast thereto, for a low contrast of the input image, the correlation value does not develop sharp variation and hence the high precision cannot be attained in the motion vector sense operation. Furthermore, when an image changes, the value of the minimum point (① in FIG. 1B) is increased and hence the displacement sense precision is lowered in some cases. Moreover, depending on an image, the gradient of the line associated with data in the neighborhood of the minimum point is reduced and hence the position of the minimum point becomes to be obscure, which resultantly decreases the precision in the motion vector sense operation in some cases.

In order to sense the states above, there are employed a mean value, a minimum value, and a gradient associated with the minimum point of the correlation value. That is, the sensed motion vector in a sense domain is regarded as valid only when the conditions below are satisfied, namely, the vector for the which the conditions are not satisfied is not treated as a candidate to determine a motion vector for that domain.

Mean value of correlation value $>A$

Mean value of correlation value $>B \times$ Minimum value of correlation value

Gradient near minimum point $>C$ where, A, B, and C are arbitrary constants.

The validity of the motion vectors sensed in respective sense domains is checked by the correlation validity decision circuit 9 in the second motion vector decision section 20, and the correlation validity information is delivered to the judge circuit 10 and the valid domain counting circuit 19. The judge circuit 10 decides a single motion vector for an entire image plane (an interim motion vector) from the sensed motion vectors which are judged to be valid, and outputs the interim motion vector to the multiplier 15. And the valid domain counting circuit 19 decides the number of domains in which the sensed motion vectors are judged to be valid or a signal proportional to that number and outputs the number or the signal as a motion vector decision information to the vector reliability density decision section 21.

Subsequently, the motion vector decision information (the number of the valid domains) is passed through the low-pass filter 13 so as to be smoothed by a time integration effect to attain a mean value with respect to time. The low-pass filter 13 thus produces an output indicating the current number of valid domains on the average with respect to time. In consequence, this value is called a time-density of the valid domains or a vector reliability density.

Figure 2:
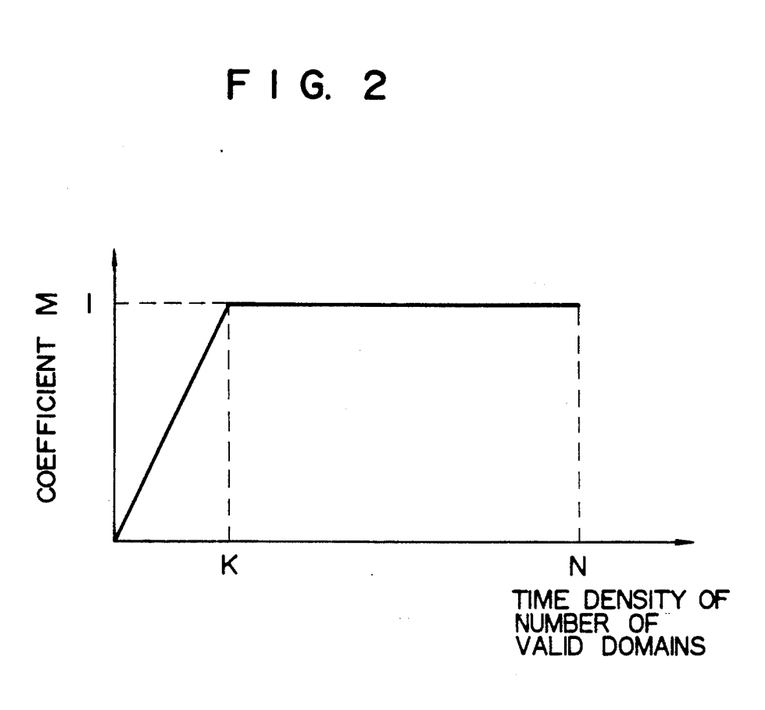
FIG. 2 is a graph schematically showing relationships between the value of a coefficient m and a time-density of number of valid domains developed in the embodiment.

Next, the output from the low-pass filter 13 is delivered to the clipping device 14, which clips an upper side of a signal designating the time-density of the valid domains. The clipping level is used as a coefficient in a multiplier 15 in an ordinary operation. Namely, when the clipping level is set so as to make a multiplication factor in the multiplier 15 is unity, the interim motion vector from the 2nd motion vector decision section 20 is directly outputted with the original magnitude in the ordinary operation. With this provision, depending on the time-density of number of the valid domain, the coefficient m to be multiplied by the interim motion vector is determined (FIG. 2). In the graph of FIG. 2, N represents the number of the sense domains in one image plane. Setting of the point k (clipping point) can be adjusted by altering the gain of the low-pass filter 13. By using the coefficient a thus obtained, the magnitude of the output motion vector is controlled as follows.

$$o\text{-vect}(n) = \text{vect}(n) \times m$$

where vect(n) is representing an interim motion vector with respect to an entire image plane of the present field, o-vect(n) is the output motion vector, and m is the coefficient determined from the time-density of the numbers of the valid domains.

Assuming here that the point k is set so as to correspond to unity of the time-density value of the number of the valid domains, in a case where the density value is unity or more, namely, where an interim motion vector for the entire image plane can always be sensed; the coefficient m to be supplied to the multiplier 15 is set to unity. Namely, in this situation, the ordinary sense operation is achieved in contrast thereto, in a case where the density value is less than unity, namely, where the input image signal is poor (e.g. where the luminance level is low, the high-frequency component is insufficient, or the like), and hence the valid motion vector is sensed only sporadically; the coefficient m to be supplied to the multiplier 15 is set to a value less than unity which results that the magnitude of the output motion vector is suppressed to a small value, whereby preventing occurrence of discontinuity with respect to time in the magnitude of the output motion vectors.

Figure 3:
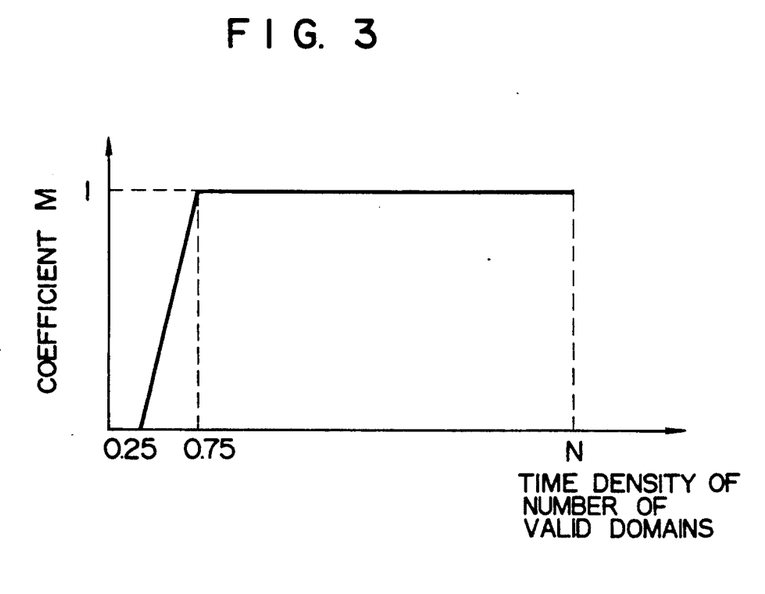
FIG. 3 is a graph illustratively showing relationships between the value of a coefficient m and a time-density of number of valid domains developed in the embodiment.

In addition, when the clipping device 14 is provided with a operation to clip negative values to zero and an offset is added to the motion vector decision information, as shown in FIG. 3, there can be developed a characteristic that the output motion vector is set to 0 when the time-density of the number of valid domains is less than a predetermined value. In the example of FIG. 3, since the ordinary motion vector sense operation is accomplished until the time-density of the number of valid domains becomes to be 0.75, even when a domain to be regarded as valid is occasionally missing, the motion vector is outputted in an ordinary manner. In contrast thereto, changing the k point value in FIG. 3 from 0.75 to 1.25, there is always attained at least one valid domain such that the motion vector output achieves the ordinary operation until there appears a case where two domains are occasionally valid and that the magnitude of the motion vector is limited when the number of the valid domains becomes to be less than the preset value. As described above, by changing characteristics of the graphs shown in FIGS. 2 and 3, it is possible to adjust characteristic which restricts the magnitude of the motion vector.

The coefficient m thus obtained is fed to the multiplier 15 so a to be multiplied by the interim motion vector, thereby attaining a motion vector of the image as the final output.

As described above, in accordance with this embodiment, a coefficient proportional to the time-density of the number of the valid domains is multiplied by an interim motion vector. Consequently, even when the state of the input image signal is poor and hence there continuously appears a state in which the image motion vector can rarely sensed, the sensed image motion vector is prevented from being discontinuous with respect to time.

Figure 4:
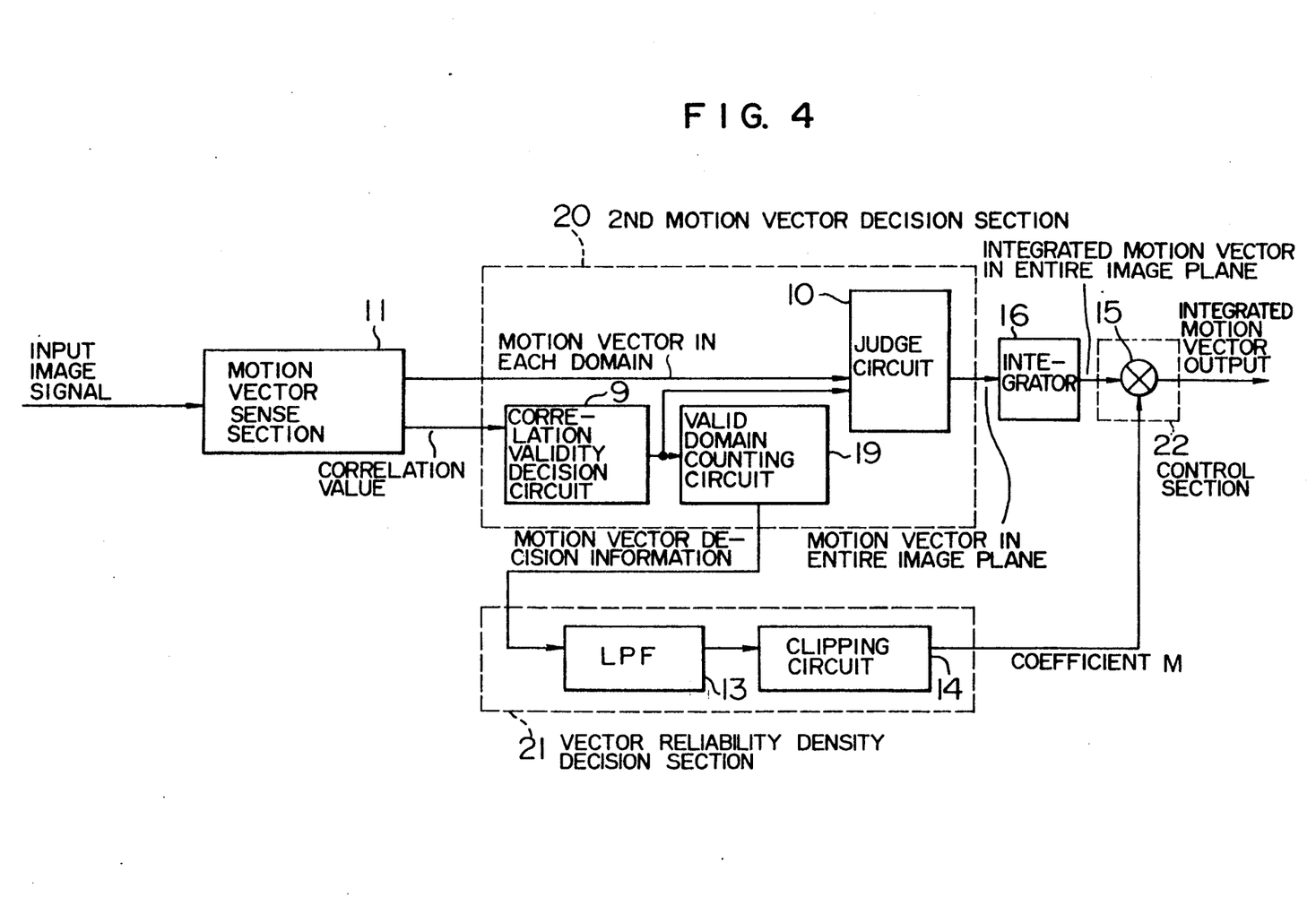
FIG. 4 is a configuration diagram of an image motion vector sensor as a second embodiment according to the present invention.

FIG. 4 shows a constitution diagram of an image motion vector sensor as a second embodiment according to the present invention. The system includes a motion vector sense section 11, a second motion vector decision section 20, a vector reliability density decision section 21 and a control section 22 which includes an integrator 16 and a multiplier 15 in series. These components are identical to those of the first embodiment except that there is disposed an integrator 16 for integrating an output (the interim motion vector) from the motion vector detecting section 11, which is followed by the multiplier 15.

A description will now be given of the operation of image motion vector sensor as the second embodiment configured as above.

In the constitution of FIG. 4, the motion vector detecting section 11 senses for each sense domain a motion vector between fields or frames of input image signals. And in succession, the correlation validity decision circuit 9 in the second motion vector decision section 20 confirms the validity of every sense domain using the output from cumulative adder 7, and delivers the motion vector validity information to the judge circuit 10 and the valid domain counting circuit 19. The judge circuit 10 decides a single motion vector for an entire image plane (an interim motion vector) from the sensed motion vectors which are decided to be valid, and outputs the interim motion vector to integrator 16. In addition, the valid domain counting circuit 19 decides the number of domains in which the sensed motion vectors are judged to be valid or a signal proportional to that number, and outputs the number or the signal as a motion vector decision information to the vector reliability density decision section 21.

The interim motion vector thus produced from the second motion vector decision section 20 here is a differential vector obtained relative to the previous field set as the reference. A motion vector relative to the initial value is attained by integrating the vector above (integrated motion vector). Although there may be employed a complete integration, in order to prevent saturation of a signal at an occurrence of an offset, there is used an incomplete integration in which all signals are not necessarily processed. In the multiplier 15, the integrated motion vector is multiplied by the coefficient m. As a result, even when the time-density of the number of valid domains is low, the integrated motion vector is prevented from being discontinuous with respect to time.

The method employed in the second embodiment to attain the coefficient m is also identical to that used in the first embodiment. Namely, by use of the low-pass filter 13, the motion vector decision information (the signal proportional to the number of valid domains) is smoothly changed with respect to time such that the clipping device 14 clips an upper side of the signal. The clipping level is set so as to make the multiplication factor in the multiplier 15 is unity. With this provision, the coefficient m to be multiplied by the interim motion vector is determined in association with the time density of the number of the valid domains (FIG. 2). Furthermore, when the clipping device 14 is provided with an operation to clip negative values to zero and an offset is added to the motion vector decision information, there can be attained a characteristic that the motion vector is kept retained to be 0 until the density of the number of valid domains is increased to a preset value as shown in FIG. 3 associated with the first embodiment.

According to the second embodiment as described above, the integrated motion vector is multiplied by a coefficient m proportional to the time-density of the number of the valid domains. In consequence, as compared with a case where a multiplication is conducted prior to an integration processing, the computation error can be prevented from being increased.

Figure 5:
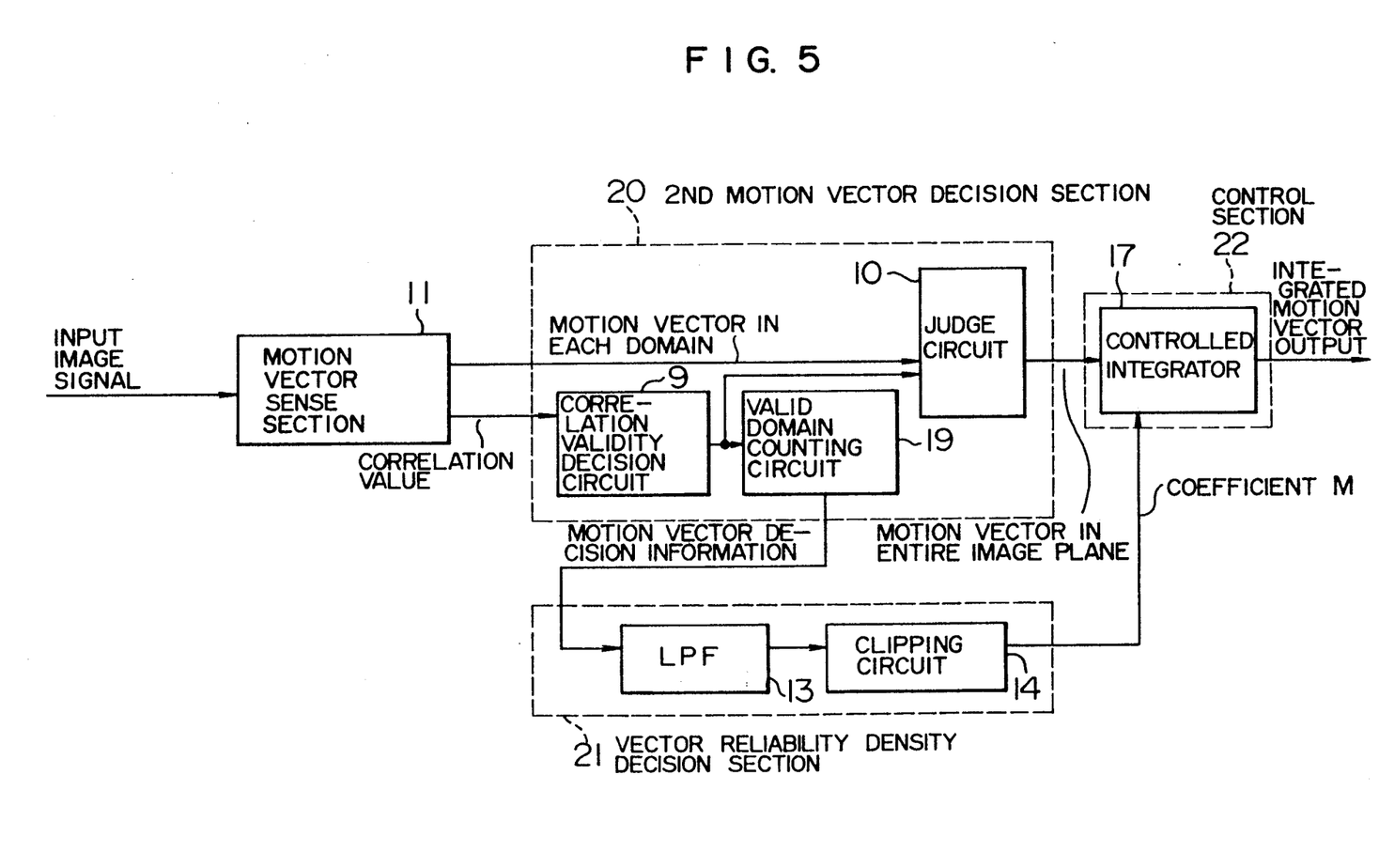
FIG. 5 is a configuration diagram of an image motion vector sensor as a third embodiment according to the present invention.

FIG. 5 shows a configuration diagram of a third embodiment in accordance with the present invention. The system includes a motion vector detecting section 11, a second motion vector decision section 20, a vector reliability density decision section 21 and a control section 22 which includes a controlled integrator 17. These components are identical to those of the second embodiment except that a measure for controlling an integration leakage quantity with the controlled integrator 17 is employed so as to control the magnitude of the output motion vector, in place of the integrator 16 and the multiplier 15.

A description will next be given of the operation of the image motion vector sensor as the third embodiment configured as above. In the constitution of FIG. 5, like in the second embodiment, the motion vector sense section 11 senses for each sense domain a motion vector between fields or frames of input image signals. And in succession, the correlation validity decision circuit 9 in the second motion vector decision section 20 confirms the validity of every sense domain using the output from cumulative adder 7, and delivers th motion vector validity information to the judge circuit 10 and the valid domain counting circuit 19. The judge circuit 10 decides a single motion vector for an entire image plane (an interim motion vector) from the sensed motion vectors which are decided to be valid, and outputs the interim motion vector to the controlled integrator 17. In addition, the valid domain counting circuit 19 decides the number of domains in which the sensed motion vectors are judged to be valid or a signal proportional to that number and outputs the number or the signal as a motion vector decision information to the vector reliability density decision section 21.

Subsequently, the output from the second motion vector decision section 20, the interim motion vector, is integrated in the controlled integrator 17. The integration is computed as follows.

$$s\text{-}vect(n) = s\text{-}vect(n-1) \times m + vect(n)$$

where, s-vect(n) is an integrated motion vector of the current field or frame, s-vect(n−1) denotes an integrated motion vector of the previous field or frame, vect(n) specifies an interim motion vector of the current field or frame, and m stands for a coefficient ($\leq 1$).

In the expression above, when m is 1, a complete integration is accomplished; whereas when the value of m becomes to be smaller, the integration error (hereinafter referred to as the "integration leakage quantity") increases. Here, the integration leakage quantity is defined as $(1-m) \times s\text{-}vect(n-1)$.

The coefficient m is controlled depending on the motion vector decision information. Namely, by use of the low-pass filter 13, the motion vector decision information (the signal proportional to the number of valid domains) is smoothly changed with respect to time. Based on this signal, the clipping device 14 produces a coefficient m. The clipping level of the clipping device 14 is set to a value slightly smaller than a value equivalent to the coefficient m=1 (e.g. 0.99).

Figure 6:
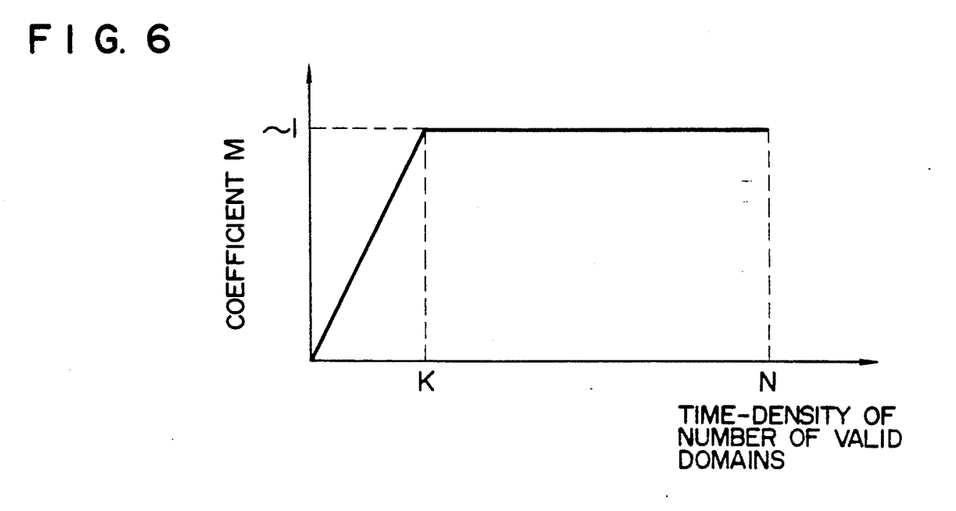
FIG. 6 is a graph illustratively showing relationships between the value of a coefficient m and a time-density of number of valid domains developed in the embodiment.

With this provision, the integration leakage quantity of the integration to be achieved on the interim motion vector can be controlled in association with the time-density of the number of the valid domains (FIG. 6). That is, when the time density of the number of the valid domains is small, the integration leakage quantity is increased to decrease the integrated motion vector so as to prevent the integrated motion vector from being discontinuous with respect to time. In FIG. 6, N stands for the number of sense domains in one image plane. Setting of the point k (clipping point) can be adjusted by altering the gain of the lowpass filter 13.

Furthermore, when the clipping device 14 is provided with an operation to clip negative values to zero and an offset is added to the motion vector decision information, there can be attained a characteristic that the motion vector is kept retained to be 0 until the time-density of the number of the valid domains is increased to a predetermined value as shown in FIG. 3 associated with the first embodiment.

In accordance with the second embodiment as described above, when the integration leakage quantity is controlled by use of the coefficient m, there remains a component of an interim motion vector is one field or frame. However, even when the state of the input image is poor and hence there continuously occurs a state where the image motion vector can be rarely sensed, it is possible to prevent the integrated motion vector of the sensed image from being discontinuous with respect to time.

Figure 7:
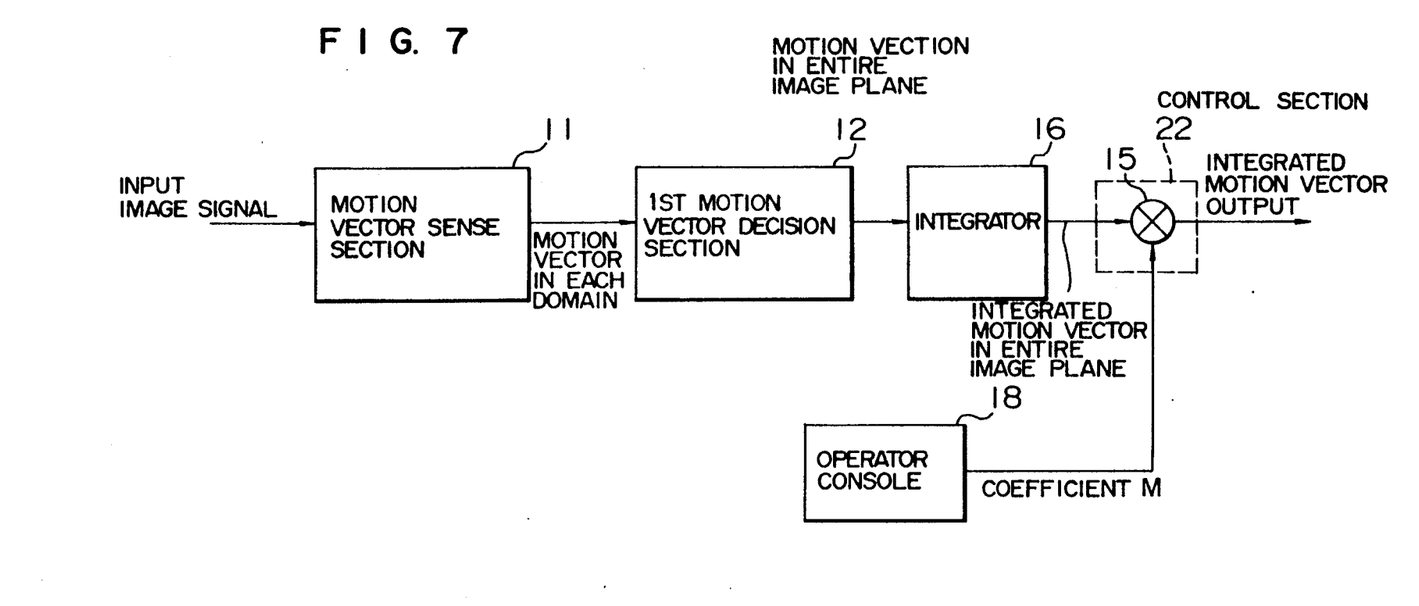
FIG. 7 is a configuration diagram of an image motion vector sensor as a fourth embodiment according to the present invention.

FIG. 7 shows a constitution diagram of a fourth embodiment according to the present invention. The system includes a motion vector sense section 11, a first motion vector decision section 12, a control section 22 which includes a multiplier 15 and an integrator 16, and an operator console 18. This embodiment is different from the first to third embodiments in that the coefficient m is not obtained by use of the motion vector decision information. Namely, the operator console 18 is used to set the coefficient m so as to control the output motion vector.

A description will now be given of the operation of the motion vector sensor as the fourth embodiment configured as above.

First, the motion vector detecting section 11 and the motion vector decision section 12 produce an integrated motion vector. The operation up to this point is identical to that conducted in the second embodiment (FIG. 4).

Thereafter, by means of the multiplier 15, the magnitude of the integrated motion vector is determined depending on the coefficient m which is supplied from the operator console 18. In the operator console 18, a human operator may directly manipulate a variable resistor and/or a switch for microcomputer input data, thereby generating a coefficient m associated with the data. This can be easily implemented, for example, there may be adopted a voltage or current value corresponding to an adjusting position of the variable resistor; alternatively, switch information may be sent to a microcomputer for this purpose.

In the multiplier 15, the coefficient m thus established is multiplied by an integration motion vector outputted from the integrator 16 so as to create a final output.

In accordance with this embodiment as described above, the magnitude of the output motion vector can be controlled depending on the judgment of the operator.

In this connection, if the signal processing in the first to fourth embodiments (FIGS. 1, 4, 5, and 7) is digitalized so as to supply the outputs (such as the motion vector and the motion vector decision information) from the first motion vector decision section 12 to a microcomputer, the operations of the vector reliability density decision section, the integrator, and the multiplier can be easily achieved through operations in the microcomputer.

Furthermore, in the fourth embodiment (FIG. 7), although the multiplier 15 is located on the output side of the integrator 16, the multiplier 15 may be disposed on the input side. In addition, in the configuration in which there is not disposed an integrator as in the case of the first embodiment (FIG. 1) and hence the displacement vector is not to be integrated, the operator console 18 may be used to supply a coefficient m to the multiplier 15. Moreover, the operator console 18 may produce a coefficient m to deliver the coefficient to the controlled integrator 17.

In addition, the first to third embodiments may be adopted at the same time such that, an output from the vector reliability density decision section, a coefficient m is supplied to the controlled integrator 17 and the multiplier 15 simultaneously.

According to the present invention as described above, there can be configured an image motion vector sensor in which even when the state of the input image is poor and hence there continues a state where the image motion vector can be rarely sensed, the motion vector of a sensed image is prevented from being discontinuous with respect to time.

While particular embodiments of the invention have been shown and described, it will be obvious to those skilled in the art that various changes and modifications may be made without departing from the present invention in its broader aspects.

What is claimed is:

1. An image motion vector sensor, comprising:
  a motion vector sense section in which an input signal of an image plane is subdivided into a plurality of sense domains so as to compute a motion vector of an image in each said domain;
  a motion vector decision section for judging validity of the motion vector in each said domain so as to decide a motion vector for an entire image plane, said motion vector decision section counting the number of the domains which contain a motion vector judged to be valid;
  a vector reliability density decision section for producing a coefficient which is a function of density with respect to time of a signal proportional to said number supplied by the motion vector decision section; and
  a control section for controlling a magnitude of the motion vector for the entire image plane based on the output of said vector reliability density decision section.

2. An image motion vector sensor according to claim 1, wherein said control section is a controlled integrator which performs integration with respect to time of the motion vector supplied by said motion vector decision section, wherein in said integration an integration leakage quantity is controlled based on the coefficient supplied by said vector reliability density decision section.

3. An image motion vector sensor according to claim 1, wherein said control section is a multiplier which performs multiplication of the motion vector supplied by said motion vector decision section and the coefficient supplied by said vector reliability density decision section.

4. An image motion vector sensor according to claim 1, wherein said control section is a combination of an integrator and a multiplier in series, said integrator performing integration with respect to time of the motion vector supplied by said motion vector decision section, and said multiplier performing multiplication of the output of said integrator and the coefficient supplied by said vector reliability density decision section.

5. An image motion vector sensor, comprising:
  a motion vector sense section in which an input signal of an image plane is subdivided into a plurality of sense domains so as to compute a motion vector of an image in each said domain;
  a motion vector decision section for judging validity of the motion vector in each said domain so as to decide a motion vector for an entire image plane;
  a control section for controlling a magnitude of the motion vector for the entire image plane; and
  an operator console for supplying said control section with a coefficient for controlling the magnitude of the motion vector for the entire image plane.

6. An image motion vector sensor according to claim 5, wherein said control section is a controlled integrator which performs integration with respect to time of the motion vector supplied by said first motion vector decision section wherein, in said integration an integration leakage quantity is controlled based on the coefficient supplied by said operator console.

7. An image motion vector sensor according to claim 5, wherein said control section is a multiplier which performs multiplication of the motion vector supplied by said motion vector decision section and the coefficient supplied by said operator console.

8. An image motion vector sensor according to claim 5, wherein said control section is a combination of an integrator and a multiplier in series, said integrator performing integration with respect to time of the motion vector supplied by said motion vector decision section, and said multiplier performing multiplication of the output of said integrator and the coefficient supplied by said operator console.

* * * * *